Patented Nov. 2, 1937

2,097,863

UNITED STATES PATENT OFFICE 2,097,863

LEGUMINOUS FOOD PRODUCT

Sidney Musher, New York, N. Y., assignor to Musher Foundation Incorporated, New York, N. Y., a corporation of New York No Drawing. Application October 2, 1934, Serial No. 746,626

2 Claims. (Cl. 99—98)

This invention relates to food products, and more particularly to food products of leguminous type of which beans may be exemplary.

In the prior art, and more particularly in recent years, "oven baked" beans have become a widely utilized food product. In their production, beans (or other legumes) admixed or incorporated with added components as may be desired, such for example as tomato sauce, etc., are placed in flat open trays or in shallow pans and are subjected to oven baking for from two to four hours, analogous substantially to the methods of the housewife in producing home type baked beans. It is at once apparent that such processes are quite expensive in commercial exploitation because they involve long periods of baking (without burning the bean), with consequent use of large ovens capable of handling relatively small quantities only of the baked bean product, because the depth of the exposed product must not be too great in order that the baking may carry through to as much of the product as possible. The large and extensive equipment and long time periods required in the operation, thus make such processes with involved overhead expenses in plant space and equipment, quite expensive. Such "oven baked" beans accordingly bring a considerable premium over canned bean products produced by other than direct heat treatment.

These drawbacks have resulted in the art producing canned bean products that are not subjected to direct heat treatment at any stage of their manipulation, with the result that they are not strictly "oven baked" beans. However, such processes are widely used because of the more economical processes and equipment that may be employed in carrying them out. Typically such processes may be represented by the following. The beans are washed, soaked in order to permit them to soften, and take up the required amount of water, and are then placed in cans, followed by the addition of such other ingredients as desired, as for example spiced tomato sauce, pork, chili con carne, or other products with which such legumes may be admixed, followed by sealing of the cans and subjecting them to cooking by the usual retort method for the necessary period, which usually varies anywhere from 1 to 4 hours at a temperature of from 212° F. to 245° F. Following such operation, the product is ready for labeling, packaging, etc.

The time and temperature of retort cooking is varied to produce different degrees of cooking, but under any condition the processing in this manner is entirely a steaming process, wherein the legumes have been canned and sealed prior to the usual cooking operation, wherein they are not exposed to any direct heat, so that no true baking operation takes place. It is because of this difference in operation, that the term "oven baked" as applied to the steamed type of bean has been questioned as to whether it is properly descriptive of beans made in this manner; and for similar reasons to those pointed out above, the oven baked beans in which direct heat treatments have been employed bring a premium in today's market.

The methods set forth above are the prior art methods that are employed in making these various canned legumes of various types including the well known pork and beans which possibly enjoys the widest sale in this field, and is one of the outstanding staple food commodities of the country. In addition, there may be mentioned such products as plain steamed beans, beans in tomato sauce, chili con carne with beans, beans and frankfurters, and a great variety of other products having as a basis the use of legumes.

Among the objects and advantages of the present invention is the production of legumes of the various types set forth above, which have been produced by the utilization of a direct heat treatment in at least one stage of their production, by the utilization of relatively simple machines or apparatus, and simple processes that materially reduce the expense over those of prior art processes.

Further objects and advantages include the production of such leguminous products of new character having a flavor quite distinct from that of the prior art types of products.

Other and further objects and advantages will appear from the more detailed description given below, it being understood, however, that this more detailed description is given by way of illustration and explanation only, and not by way of limitation, since various changes therein may be made by those skilled in the art without departing from the scope and spirit of the present invention.

In carrying out the present invention, it has been found that such leguminous products of which beans may be taken as exemplary, may be utilized in new methods of relatively inexpensive character if such products are given a roast for a relatively short period of time prior to or during the stage of manufacture of the desired food products. The invention will be particularly illustrated in connection with the use of the ordinary Michigan pea bean. Such pea beans are cleaned in any desired manner as by air to remove all foreign particles, and are then subjected to a short roasting operation. The roasting need not be very extensive, and may last for a period of from 1 to 5 minutes. A period of 3 to 5 minutes roast is found most desirable in order to give the desired flavor, and to turn out the most acceptable product. The degree of roast depends, however, upon individual taste, and a slight roast of only 1 minute is sufficient to change the flavor of the finished bean quite substantially. Similarly under conditions where an especially high roast is desired, the roasting operation may extend beyond even the 5 minute period.

The temperatures employed lie within the range of those commonly used in the roasting of coffee. Therefore the usual temperature of the bean during the roasting operation will vary between 360° F. and 380° F.

This roasting operation is an exceedingly simple one, and may be carried out in machinery already available on the market, as for example by the use of the ordinary coffee roasting machine.

During the roasting process, the beans naturally become somewhat darker in color. Immediately following the roast, and while the beans are still hot, they are desirably thrown into water, preferably boiling water, for soaking, or soaked under pressure. After they have taken up the desired amount of water, they may be canned along with the other flavoring ingredients, such as tomato sauce, pork, chili con carne, etc.

The cans are then sealed and subjected to further cooking operation as by the usual steaming commonly employed, whether in retorts or by the continuous process. This steaming applied to the roasted beans, requires only from one-half to three-quarters of the time normally required for steaming under prior art processes, because of the original roast that has been given to the beans. It has been found, for example, that a satisfactory product is obtained by steaming for 2 hours at 240° F.

Considerable time is saved by the operation, including both overhead expense for machinery and plant, as well as the saving of time in the operation as against the usual methods of steaming for longer periods employed in the prior art. In addition, the beans hold their shape much better than by the oven baked method, as when the soaked beans are subjected to open heat their skins crack readily. Whereas the initial roasting of the beans and subsequent soaking does not permit the same extent of cracking of the skins of the beans.

Under these conditions further, the finished product has the full roast flavor, and is even more desirable than if the beans were oven baked in the usual expensive manner following soaking. These methods of manufacture involving a roasting operation at some time during the manufacture of the leguminous product, opens an entirely new field in the manufacture of baked beans and other types of products along these lines because of simplicity in operation and reduction in cost of manufacture, enabling any manufacturer now turning out steamed pork and beans, for example, to produce at a material saving in cost of operation, and with the use of only very inexpensive equipment readily available on the market, a bean type product in which direct heat treatment has been employed in its manufacture, and which therefore is of the baked bean type, and which product will therefore bring a substantial premium over the price of steamed beans in the market today.

Variations in these methods as set forth herein may be employed. For example, while the roasting operation set forth above has been illustrated with the beans in substantially dry condition, they may be roasted in oil if desired, any edible or glyceride oil being employed for this purpose, with subsequent filtering off of any excess of oil following the roasting treatment. The oil roasted beans are then finished in the usual manner, such as that described above. It has also been found that a desirable flavor may be developed by first giving the bean a mild roast in its raw condition, and then subjecting it to a second slight roast in oil; or these steps may be reversed, depending upon the flavor desired, as the flavor of the product is materially influenced by these manners of operation. The second slight roast may be for a shorter period than that initially employed in the first roasting operation, or it may be of the same duration.

If desired, and it is at times advantageous, a small percentage of crushed seeds or cereals may be added to the beans during the roasting operation in order to develop new types of flavors. Such crushed seeds or cereals are illustrated by crushed sesame seed, soya bean flour, oat flour, barley flour, etc. The addition of such materials is particularly desirable in those cases where the beans are roasted in oil, as the addition of these materials not only lends anti-oxidant qualities, but also lends new and desirable flavor. The utilization of such materials for anti-oxidant purposes and for modifying flavors of food products is particularly emphasized in companion copending applications, Nos. 696,915, filed November 6, 1933; 698,543, filed November 17, 1933; 710,727, filed February 10, 1934; and 733,517, filed July 2, 1934 to which reference is made, and which methods may be employed in accordance with the present invention. As pointed out in those cases, the anti-oxidant activity of certain materials found in cereals, fruits, nuts and seeds may be advantageously utilized.

It is not necessary in carrying out the present invention to complete the operation of cooking or steaming of the roasted legume to produce the final product. The roasted legume itself is available for direct sale to the consumer, so that the housewife can by a simple cooking of such roasted beans, as for example in boiling water, turn out a full flavored baked bean without the expense of the oven operation, and in a much shorter period of time than would be necessary with the unroasted beans.

The invention is not limited to the use of any particular type of bean, as the methods can be employed and the products produced with any leguminous or similar vegetable material. Further any desired flavoring material may be added, and the time and temperatures of processing may be varied to suit particular taste or operation.

Having thus set forth my invention, I claim:

1. In the method of preparing beans to produce a product having the characteristics of an oven baked bean, the steps of roasting the substantially whole, dry, non-fatty, edible beans for a period of about 1 to 5 minutes, and steaming the bean to cooked condition whereby a bean simulating an oven baked bean is obtained.

2. In the method of preparing beans to produce a product having the characteristics of an oven baked bean, the steps of roasting the substantially whole, dry, non-fatty, edible beans for a period of about 1 to 5 minutes while immersed in an edible oil, draining the oil from the beans, and steaming the oil-roasted bean to cooked condition, whereby a bean simulating an oven baked bean is obtained.

SIDNEY MUSHER.